US012809014B2

(12) United States Patent
O'Connor et al.

(10) Patent No.: US 12,809,014 B2
(45) Date of Patent: Nov. 24, 2026

(54) MEASURING VEHICLE VELOCITY USING MULTIPLE ONBOARD RADARS

(71) Applicant: Symeo GmbH, Neubiberg (DE)

(72) Inventors: Alan Christopher O'Connor, Dedham, MA (US); Peter Gulden, Aliso Viejo, CA (US); Fabian Kirsch, Schiffdorf (DE); Christoph Mammitzsch, Neubiberg (DE); Marcel Hoffmann, Erlangen (DE)

(73) Assignee: Symeo GmbH, Neubiberg (DE)

( * ) Notice: Subject to any disclaimer, the term of this patent is extended or adjusted under 35 U.S.C. 154(b) by 482 days.

(21) Appl. No.: 18/044,545

(22) PCT Filed: Jan. 14, 2021

(86) PCT No.: PCT/EP2021/050670
§ 371 (c)(1),
(2) Date: Mar. 8, 2023

(87) PCT Pub. No.: WO2022/053181
PCT Pub. Date: Mar. 17, 2022

(65) Prior Publication Data

US 2023/0333236 A1 Oct. 19, 2023

Related U.S. Application Data

(60) Provisional application No. 63/075,653, filed on Sep. 8, 2020.

(51) Int. Cl.
*G01S 13/60* (2006.01)
*G01S 13/58* (2006.01)
(Continued)

(52) U.S. Cl.
CPC ............ *G01S 13/60* (2013.01); *G01S 13/583* (2013.01); *G01S 13/589* (2013.01); *G01S 13/931* (2013.01); *G01S 13/933* (2020.01)

(58) Field of Classification Search
CPC ...... G01S 13/60; G01S 13/933; G01S 13/583; G01S 13/589; G01S 13/931
See application file for complete search history.

(56) References Cited

U.S. PATENT DOCUMENTS

| | | | |
|---|---|---|---|
| 4,994,809 | A | 2/1991 | Yung et al. |
| 6,982,668 | B1 | 1/2006 | Doerry et al. |

(Continued)

FOREIGN PATENT DOCUMENTS

| | | |
|---|---|---|
| CN | 105842684 | 8/2016 |
| CN | 106053879 | 10/2016 |

(Continued)

OTHER PUBLICATIONS

"International Application Serial No. PCT/EP2021/050670, International Search Report mailed May 18, 2021", 5 pgs.

(Continued)

*Primary Examiner* — Vladimir Magloire
*Assistant Examiner* — Hailey R Le
(74) *Attorney, Agent, or Firm* — Schwegman Lundberg & Woessner, P.A.

(57) ABSTRACT

Estimating the ego-motion of a vehicle, e.g., the self-motion of the vehicle, can be improved by pre-processing data from two or more radars onboard the vehicle using a processor common to the two or more radars. The common processor can pre-process the data using a velocity vector processing technique that can estimate a velocity vector at each point of a predefined number of points, such as arranged in a grid in the field-of-view of radars, with coordinates (X, Y, Z (optional)), where U is the component of the velocity in the X-direction, V is the component of the velocity in the Y-direction, and W is the component of the velocity in the optional Z-direction.

24 Claims, 5 Drawing Sheets

(51) Int. Cl.
*G01S 13/931* (2020.01)
*G01S 13/933* (2020.01)

(56) References Cited

U.S. PATENT DOCUMENTS

| | | | | |
|---|---|---|---|---|
| 10,634,766 | B2 | 4/2020 | Stachnik et al. | |
| 10,634,777 | B2 | 4/2020 | Oh et al. | |
| 2006/0202886 | A1 | 9/2006 | Mahapatra et al. | |
| 2007/0200750 | A1 | 8/2007 | Cataldo | |
| 2009/0224965 | A1* | 9/2009 | Venkatachalam | G01S 7/12 342/26 R |
| 2016/0274589 | A1* | 9/2016 | Templeton | G01S 17/86 |
| 2017/0293025 | A1* | 10/2017 | Davis | G01S 7/0233 |
| 2018/0356517 | A1* | 12/2018 | Cieslar | G01S 13/42 |
| 2019/0107614 | A1* | 4/2019 | Dobrev | G01S 13/34 |
| 2019/0187267 | A1 | 6/2019 | Li et al. | |
| 2019/0187269 | A1 | 6/2019 | Tong et al. | |
| 2019/0204435 | A1* | 7/2019 | Poiger | G01S 13/878 |
| 2019/0369222 | A1* | 12/2019 | Oh | G01S 13/931 |
| 2019/0369228 | A1 | 12/2019 | Stachnik et al. | |
| 2020/0049811 | A1 | 2/2020 | Bialer et al. | |
| 2020/0278440 | A1 | 9/2020 | Wang et al. | |
| 2020/0371228 | A1* | 11/2020 | Wang | G01S 13/874 |
| 2021/0018615 | A1* | 1/2021 | Su | G01S 13/726 |

FOREIGN PATENT DOCUMENTS

| | | | |
|---|---|---|---|
| CN | 111133398 | | 5/2020 |
| CN | 116057411 | | 5/2023 |
| DE | 102012024998 | A1 | 6/2014 |
| DE | 102013016282 | A1 | 3/2015 |
| DE | 102013019804 | A1 | 5/2015 |
| DE | 102013021401 | A1 | 6/2015 |
| DE | 102017110063 | A1 | 9/2018 |
| EP | 4211496 | | 7/2023 |
| WO | WO-2016032361 | A1 | 3/2016 |
| WO | WO-2018033636 | A1 | 2/2018 |
| WO | WO-2019185739 | A1 | 10/2019 |
| WO | WO-2022053181 | A1 | 3/2022 |

OTHER PUBLICATIONS

"International Application Serial No. PCT/EP2021/050670, Written Opinion mailed May 18, 2021", 13 pgs.

Dominik, Kellner, et al., "Instantaneous ego-motion estimation using multiple Doppler radars", 2014 IEEE International Conference on Robotics and Automation (ICRA), IEEE, DOI: 10.1109/ICRA.2014.6907064 [retrieved on Sep. 22, 2014], (May 31, 2014), 1592-1597.

Kellner, Dominik, et al., "Instantaneous Full-Motion Estimation of Arbitrary Objects using Dual Doppler Radar", IEEE Intelligent Vehicles Symposium (IV), Dearborn, MI, USA, (Jun. 8-11, 2014), 324-329.

Maximilian, Steiner, et al., "Ego-Motion Estimation using Distributed Single-Channel Radar Sensors", 2018 IEEE MTT-S International Conference on Microwaves for Intelligent Mobility (ICMIM), IEEE, DOI: 10.1109/ICMIM.2018.8443509 [retrieved on Aug. 21, 2018], (Apr. 15, 2018), 1-4.

Monaco, Chris D, et al., "Motion Estimation From Doppler and Spatial Data in SONAR Images", IEEE Journal of Oceanic Engineering, IEEE Service Center, Piscataway, NJ, US, vol. 46, No. 2, (Jun. 16, 2020), 665-674.

"Chinese Application Serial No. 202180053391.1, Office Action mailed Aug. 28, 2025", w/ English translation, 18 pgs.

"Chinese Application Serial No. 202180053391.1, Response filed Aug. 22, 2025 to Office Action mailed Apr. 22, 2025", W/ English Claims, 16 pgs.

"International Application Serial No. PCT EP2021 050670, International Preliminary Report on Patentability mailed Mar. 23, 2023", 15 pgs.

"European Application Serial No. 21700722.8, Response to Communication Pursuant to Rules 161 and 162 EPC filed Oct. 30, 2023", 15 pgs.

"Chinese Application Serial No. 202180053391.1, Office Action mailed Apr. 22, 2025", w English Translation, 22 pgs.

"European Application Serial No. 21700722.8, Communication Pursuant to Article 94(3) EPC mailed Jun. 17, 2025" 5 pgs.

"Chinese Application Serial No. 202180053391.1, Decision of Rejection mailed Nov. 19, 2025", w/ English translation, 18 pgs.

"European Application Serial No. 21700722.8, Response filed Dec. 17, 2025 Communication Pursuant to Article 94(3) EPC mailed Jun. 17, 2025", 17 pgs.

"Chinese Application Serial No. 202180053391.1, Response filed Oct. 20, 2025 to Office Action mailed Aug. 28, 2025", w English Claims, 18 pgs.

"Chinese Application Serial No. 202180053391.1, Correction Notice mailed Apr. 7, 2023", W/ Machine English Translation, 3 pg.

"Chinese Application Serial No. 202180053391.1, Request for Reexamination filed Feb. 13, 2026", w/ English Claims, 17 pgs.

* cited by examiner

MEASURING VEHICLE VELOCITY USING MULTIPLE ONBOARD RADARS

CLAIM OF PRIORITY

This application is a U.S. National Stage of PCT Application Serial Number PCT/EP2021/050670, titled "MEASURING VEHICLE VELOCITY USING MULTIPLE ONBOARD RADARS" TO Alan O'Connor et al, filed Jan. 14, 2021 and published as WO 2022/053181 A1 on Mar. 17, 2022, which claims the benefit of priority of U.S. Provisional Patent Application Ser. No. 63/075,653, titled "SYSTEM AND METHOD FOR MEASURING THE VELOCITY OF A VEHICLE USING A MULTIPLICITY OF ONBOARD RADARS" to Alan O'Connor et al., filed on Sep. 8, 2020, the entire contents of which being incorporated herein by reference.

FIELD OF THE DISCLOSURE

This document pertains generally, but not by way of limitation, to radar systems, and more particularly, to radar systems for use with vehicles.

BACKGROUND

Radars are present on passenger vehicles to provide a number of safety-related and convenience features, including emergency braking, adaptive cruise control, and automated parking. The scene observed by a radar onboard a vehicle can include a large number of scattering centers—other vehicles, the road surface, objects at the edge of the road, pedestrians, etc. The raw measurements made by the radar are a combination of echoes produced by each of these objects, plus noise. Using various approaches, radars can process the raw measurements and thereby measure a number of quantities pertaining to each target in the scene, such as a range to a target, a radial component of a relative velocity of the target, and an angle that the line-of-sight to the target makes with the radar antenna.

SUMMARY OF THE DISCLOSURE

This disclosure is directed to techniques to accurately estimate the ego-motion of a vehicle by improving the accuracy of the turn rate estimation of the vehicle. An estimate of the ego-motion of a vehicle, e.g., the self-motion of the vehicle, can be improved by pre-processing data from two or more radars onboard the vehicle using a processor common to the two or more radars. The common processor can pre-process the data using a velocity vector processing technique that can estimate a velocity vector (U, V, W (optional)) at each point of a predefined number of points, such as arranged in a grid in the field-of-view of radars, with coordinates (X, Y, Z (optional)), where U is the component of the velocity in the X-direction, V is the component of the velocity in the Y-direction, and W is the component of the velocity in the optional Z-direction.

In some aspects, this disclosure is directed to a system for estimating an ego-motion of a vehicle, the system comprising: a first radar transceiver unit to be positioned on or within the vehicle, the first radar transceiver unit transmit a first signal and receive a first echo signal in response to the transmitted first signal; a second radar transceiver unit to be positioned on or within the vehicle, the second radar transceiver unit to transmit a second signal and receive a second echo signal in response to the transmitted second signal, wherein the first signal and the second signal are reflected by an environment of the vehicle; and a processor coupled to both the first and second radar transceiver units, the processor to: receive data representing both the first and second echo signals;

using the data representing both the first and second echo signals, determine respective components corresponding to velocity vectors or vector components at respective locations in a coordinate system defined relative to a field-of-view; and using the determined velocity vectors or vector components, estimate at least one of a velocity value, a velocity vector, or an angular rate of the vehicle, including suppressing a contribution to the estimate corresponding to at least one target moving with respect to a fixed frame of reference.

In some aspects, this disclosure is directed to a method for estimating an ego-motion of a vehicle, the method comprising: transmitting, using a first radar transceiver unit, a first signal and receiving a first echo signal in response to the transmitted first signal; transmitting, using a second radar transceiver unit, a second signal and receiving a second echo signal in response to the transmitted second signal, wherein the first signal and the second signal are reflected by an environment of the vehicle; and using a processor coupled to both the first and second radar transceiver units: receiving data representing both the first and second echo signals;

using the data representing both the first and second echo signals, determining respective components corresponding to velocity vectors at respective locations in a coordinate system defined by a field-of-view; and using the determined velocity vectors, estimating at least one of a velocity value, a velocity vector, or an angular rate of the vehicle, including suppressing a contribution to the estimate corresponding to at least one target moving with respect to a fixed frame of reference.

In some aspects, this disclosure is directed to a system for estimating a self-motion of a vehicle, the system comprising: a first frequency-modulated continuous wave (FMCW) radar transceiver unit to be positioned on or within the vehicle, the first radar transceiver unit to transmit a first signal and receive a first echo signal in response to the transmitted first signal; a second FMCW radar transceiver unit to be positioned on or within the vehicle, the second radar transceiver unit to transmit a second signal and receive a second echo signal in response to the transmitted second signal; a third FMCW radar transceiver unit to be positioned on or within the vehicle, the third radar transceiver unit to transmit a third signal and receive a third echo signal in response to transmitted third signal, wherein the first signal, the second signal, and the third signal are reflected by an environment of the vehicle; and a processor coupled to each of the first FMCW radar transceiver unit, the second FMCW radar transceiver unit, and the third FMCW radar transceiver unit, the processor to: receive data representing the first echo signal, the second echo signal, and the third echo signal; using the data representing the first echo signal, the second echo signal, and the third echo signal, determine respective components corresponding to velocity vectors at respective locations in a coordinate system defined by a field-of-view; and using the determined velocity vectors, estimate at least one of a velocity value, a velocity vector, or an angular rate of the vehicle, including suppressing a contribution to the estimate corresponding to the at least one target moving with respect to a fixed frame of reference.

In some aspects, this disclosure is directed to a system for estimating an ego-motion of a vehicle, the system comprising: a first radar transceiver unit to be positioned on or within the vehicle, the first radar transceiver unit transmit a first signal and receive a first echo signal in response to the transmitted first signal; a second radar transceiver unit to be positioned on or within the vehicle, the second radar transceiver unit to transmit a second signal and receive a second echo signal in response to the transmitted second signal, wherein the first signal and the second signal are reflected by an environment of the vehicle; and a processor coupled to both the first and second radar transceiver units, the processor to: receive data representing both the first and second echo signals; using the data representing both the first and second echo signals, determine respective components corresponding to velocity vectors or vector components at a number of points in a coordinate system defined relative to a field-of-view of both the first and second radar transceiver units.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
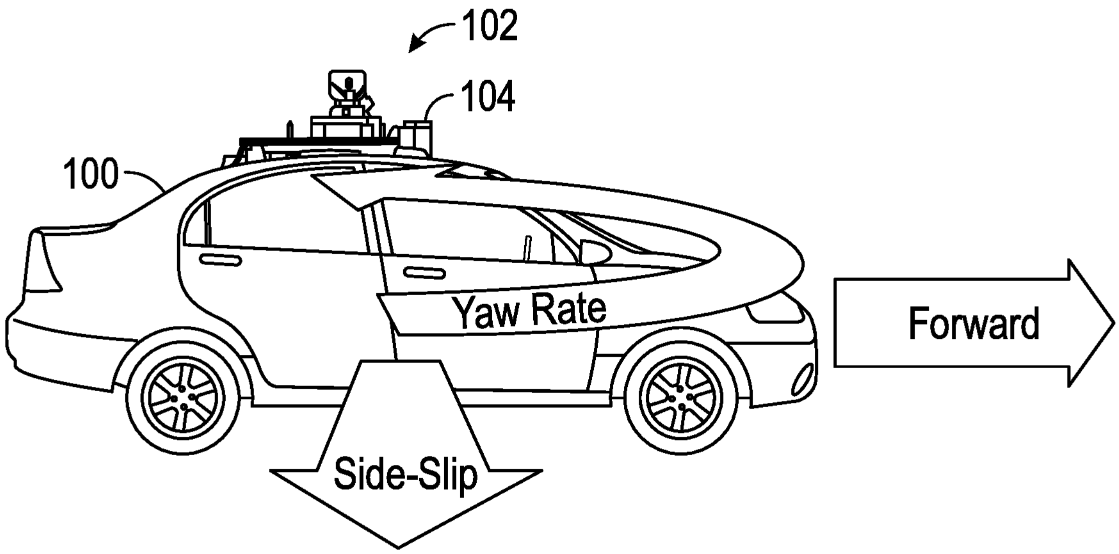
FIG. 1A is a conceptual diagram of an example of a vehicle that includes a system for estimating an ego-motion of the vehicle using various techniques of this disclosure.

Many objects that move including, but not limited to, vehicles, autonomous vehicles, boats, unmanned aerial vehicles (UAVs), such as drones, are capable of using onboard sensors including radars to sense and react to its environment, thereby allowing the vehicle to operate respond to the environment without human involvement.

The object needs to know whether it is stationary or moving and, if moving, how it is moving relative to its environment. Ego-motion (or "ego-velocity" or "self-motion") can refer to the motion parameters of a vehicle from the perspective of the vehicle, such as in the coordinate system of the vehicle, for example. The motion parameters of the object can be described in the coordinate frame of the object (the "ego frame") or a coordinate system fixed relative to the ground (the "world frame"). The full set of motion parameters include velocity components in each direction and rotation rates about each axis.

When ego-motion estimation is performed using radars that use the Doppler effect, the estimation can be very accurate in the direction of the travel of the vehicle. However, the present inventors have recognized a need to improve the accuracy of estimation of the lateral motion and rotation rate of a vehicle. To correctly respond to the environment, an autonomous vehicle should be able to precisely measure whether it is veering to the left or to the right. For example, it is desirable to know whether a second vehicle that is 200 meters (m) in front of the vehicle is in the same lane as the vehicle or an adjacent lane.

The present inventors have developed techniques to more accurately estimate the ego-motion of a vehicle by improving the accuracy of the turn rate estimation of the vehicle. As described in detail below, an estimate of the ego-motion of a vehicle, e.g., the self-motion of the vehicle, can be improved by pre-processing data from two or more radars onboard the vehicle using a processor common to the two or more radars. The common processor can pre-process the data using a velocity vector processing technique that can estimate a velocity vector (U, V, W (optional)) at various points, such as arranged in a grid in the field-of-view of radars, with coordinates (X, Y, Z (optional)), where U is the component of the velocity in the X-direction, V is the component of the velocity in the Y-direction, and W is the component of the velocity in the optional Z-direction.

The velocity vectors can then be applied to a detector that evaluates the power associated with a corresponding vector and removes points prior to applying the remaining velocity vectors to an ego-motion estimator.

By applying the radar data to a common pre-processing node and pre-processing the data before applying the data to a detector, the present inventors have found substantial improvements in ego-motion estimation, such as six-fold improvement in yaw rate estimates. Better estimates of ego-motion can improve, among other things, 1) discrimination between targets that are stationary or moving, 2) tracking of moving targets, 3) detection of skidding, 4) generation of focused imagery (SAR), for automated parking, and 5) bias compensation of other onboard sensors such as MEMS gyros.

The techniques of this disclosure contrast with other approaches in which, for example, the data from the radars is not pre-processed by a common processing node. Rather, with other approaches, each radar is coupled with a corresponding detection process that operates independently for each radar. Each independent detection process estimates only a radial velocity component from each radar to each detected target, but the set of targets detected by each radar are not necessarily the same. Because these other approaches cannot obtain velocity vectors for a set of targets, their estimates of some ego-motion parameters are more sensitive to random noise present in the radar data.

FIG. 1A is a conceptual diagram of an example of a vehicle 100 that includes a system 102 for estimating an ego-motion of the vehicle using various techniques of this disclosure. The system 102 can include two or more radar transceiver units 104 that can be positioned on or within the vehicle 100. Each of the radar transceiver units 104 can transmit a signal and receive an echo signal in response to transmitted signal. By using various techniques described below, the system 102 can determine various motion parameters of the vehicle, including forward motion, side-slip motion, up/down motion, turn rate, yaw rate, roll rate, and pitch rate of the vehicle 100.

Figure 1B:
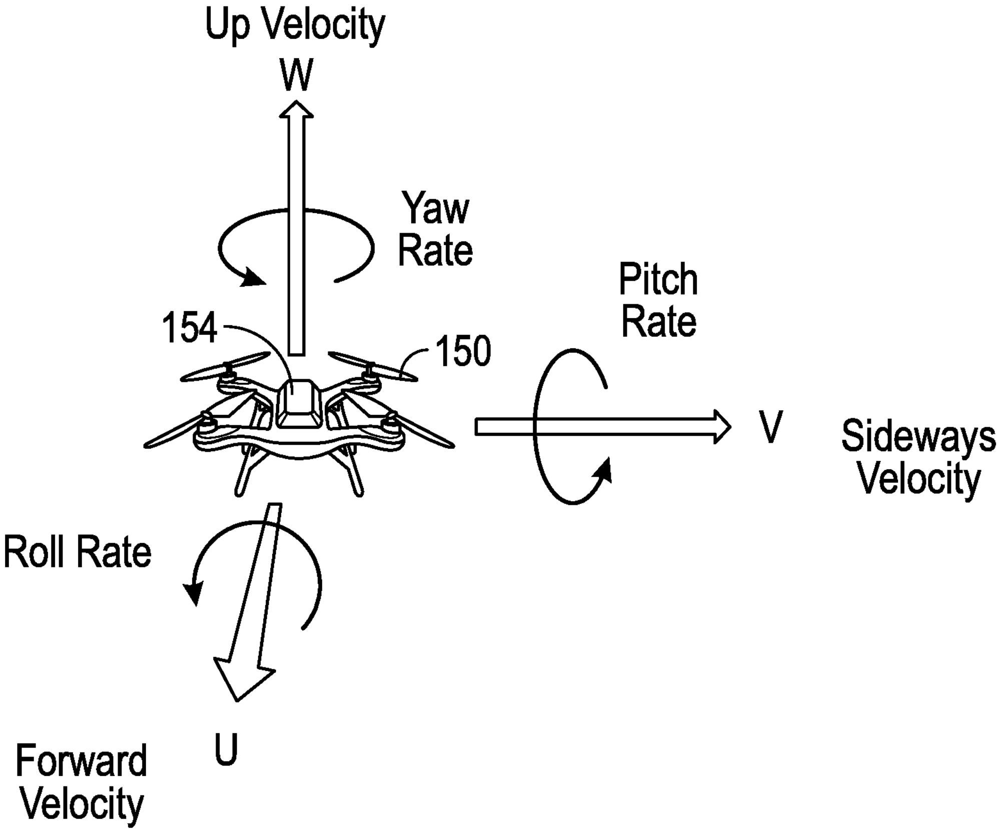
FIG. 1B is a conceptual diagram of an example of an unmanned aerial vehicle (UAV) that includes a system for estimating an ego-motion of the UAV using various techniques of this disclosure.

FIG. 1B is a conceptual diagram of an example of an unmanned aerial vehicle (UAV) 150 that can include a system for estimating an ego-motion of the UAV using various techniques of this disclosure. The system 152 can include three radar transceiver units that can be positioned on or within the UAV 150. Each of the radar transceiver units can transmit a signal and receive an echo signal in response to transmitted signal. By using various techniques described below, the system 152 can determine various three-dimensional (3D) motion parameters of the UAV, including up velocity, sideways velocity, forward velocity, yaw rate, pitch rate, and roll rate of the vehicle 150.

Figure 2:
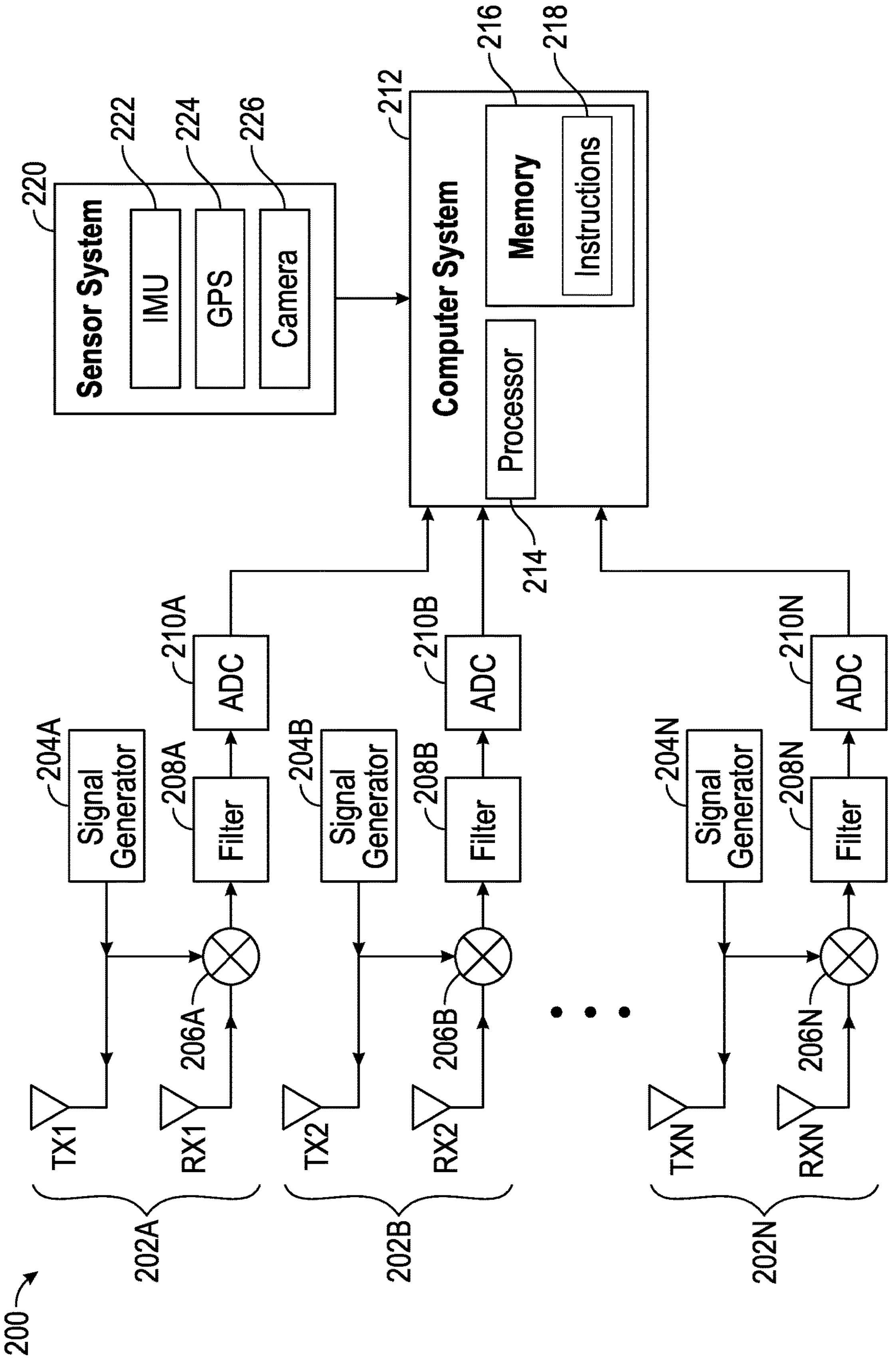
FIG. 2 is a simplified block diagram of an example of a system for estimating an ego-motion of the vehicle using various techniques of this disclosure.

FIG. 2 is a simplified block diagram of an example of a system 200 for estimating an ego-motion of the vehicle using various techniques of this disclosure. The system 200 can include two or more radar transceiver units 202A-202N. In some examples, the radar transceiver units 202A-202N can implement frequency-modulated continuous wave (FMCW) radar techniques. To determine two-dimensional (2D) motion parameters, at least two radar transceiver units can be used. To determine three-dimensional (3D) motion parameters, at least three radar transceiver units can be used.

The radar transceiver unit 202A can include a signal generator 204A that can be used to generate electromagnetic signals for transmission. The signal generator 204A can include, for example, a frequency synthesizer, a waveform generator, and a master oscillator. In some examples, the signal generator 204A can generate the signal as one or more chirps, where a chirp is a sinusoidal signal having a frequency that increases or decreases with time. The signal generator 204A can generate a signal that can be transmitted toward an environment by a transmit antenna TX1. The radar transceiver unit 202A can include one or more receive antennas RX1 to receive an echo signal in response to the transmitted signal. In some examples, a transmit antenna and a receive antenna can be the same antenna.

The transmitted signal and the received echo signal can be applied to corresponding inputs of a mixer 206A to generate an intermediate frequency (IF) signal. The IF signal can be applied to a filter 208A, such a low pass filter, and the filtered signal can be applied to an analog-to-digital converter (ADC) 210A.

As seen in FIG. 2, the system 200 can include a second radar transceiver unit 202B. In some examples, the system 200 can include more than two radar transceiver units, such as to determine 3D motion parameters. The radar transceiver units 202B-202N can include components similar to those of radar transceiver unit 202A.

The digital output of the ADCs 210A-210N can be applied to a computer system 212. The computer system 212 can include a processor 214, which can include a digital signal processor (DSP), and a memory device 216 coupled to the processor 214 that can store instructions 218 for execution by the processor 214 that specify actions to be taken by the computer system 212.

In some examples, the system 200 can include auxiliary sensor system 220 that can provide sensor data to the computer system 212. The auxiliary sensor system 220 can include, for example, one or more of an inertial measurement unit (IMU) 222, a global navigation satellite system (GNSS) receiver 224, and/or a camera 226.

Using various techniques of this disclosure and as described in more detail below, the processor 214 can receive data representing both the first and second echo signals, such as the outputs of ADCs 210A, 210B, wherein the received data is reflected by an environment of the vehicle, such as by stationary and/or moving objects. A third (or more) echo signal can be used for 3D motion parameter estimation. Then, using the data representing both the first and second echo signals, the processor 214 can determine respective components corresponding to velocity vectors at respective locations in a coordinate system defined by a field-of-view, such as in front of the vehicle, to the side of the vehicle, behind the vehicle, and the like.

The processor 214 can use the determined respective components corresponding to the velocity vectors to estimate the ego-motion of the vehicle, such as at least one of a velocity value, a velocity vector, or an angular rate of the vehicle. In some examples, the processor 214 can suppress a contribution to the estimate corresponding to targets moving with respect to a fixed frame of reference, such as the coordinate system of the vehicle or a global coordinate system.

Using these techniques, the system 200 can extract relative velocity vectors for a number of points, such as predefined points, in the field-of-view of the two or more radar transceiver units 202A-202N. The points can be defined relative to a fixed frame of reference, such as the vehicle's coordinate frame. In some examples, the points can be arranged in a grid. In other examples, the points can be denser in the direction of travel. In some examples, the points can be denser closer to the vehicle.

The processor 214 can aggregate the information from the two or more radar transceiver units 202A-202N that corresponds with objects that are stationary with respect to the fixed frame of reference, such as guardrails, signs, grass, pavement, and the like. Then, the processor 214 can use the relative velocities of those objects to estimate the ego-motion of the vehicle with respect to the fixed frame of reference while ignoring velocity vectors that are inconsistent with those relative velocities, such as moving objects, e.g., other vehicles, in the field-of-view.

Figure 3:
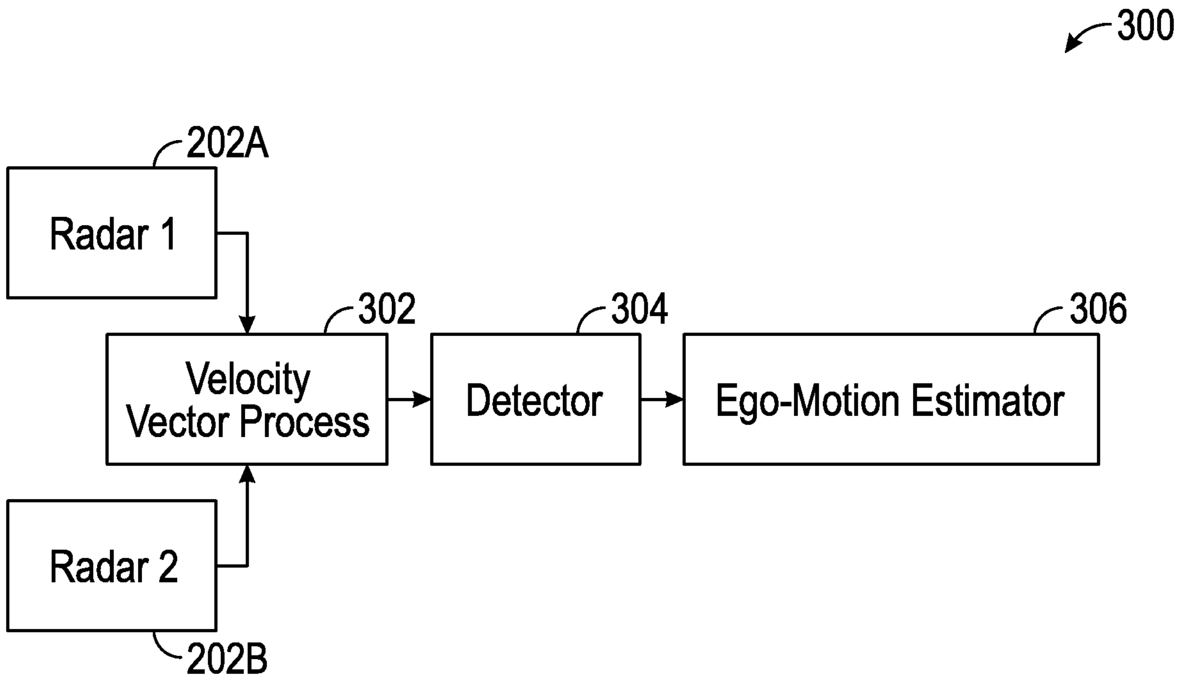
FIG. 3 is a simplified diagram of an example of estimating an ego-motion of the vehicle using various techniques of this disclosure.

FIG. 3 is a simplified diagram of an example of estimating an ego-motion of the vehicle using various techniques of this disclosure. The system 300 is shown with first and second radar transceiver units 202A, 202B, but can include more than two radar transceiver units when 3D motion parameters are desired.

The first and second radar transceiver units 202A, 202B can be located on the vehicle and separated by a known distance. In some examples, the radar transceiver units can be located near the front of the vehicle, such as separated by about 1 meter, and oriented to observe an overlapping area in front of the vehicle. The radar transceiver units can make simultaneous scans of their respective fields-of-view. Any interference between the radar transceiver units can be managed through time-division, frequency-division, or another multiple-access method.

The data, e.g., raw data, from the first and second radar transceiver units 202A, 202B can be applied to a processor coupled to both the first and second radar transceiver units, e.g., a common processing node, such as the processor 214 of FIG. 2. Using the data, the processor can execute instructions to perform a velocity vector process 302 to determine or estimate respective components corresponding to velocity vectors, such as components (U, V), at each predefined point with coordinates (X, Y) in the field-of-view of the first and second radar transceiver units 202A, 202B.

For 3D implementations, the processor can execute instructions to perform a velocity vector process 302 to determine or estimate respective components corresponding to velocity vectors, such as vector components (U, V, W), at each predefined point with coordinates (X, Y, Z) in the field-of-view of the three or more radar transceiver units. The velocity vector process 302 can transform the reference frames of the multiple radar transceiver units into a common reference frame.

In some examples, for each predefined point (X, Y), the velocity vector process 302 can output a data structure with the following data: (X, Y, U, V, P), where (X, Y) are spatial coordinates of the reference frame of the vehicle, (U, V) are the respective components corresponding to velocity vectors at the (X, Y) coordinate, and P is a measure of the signal power for the point. The velocity vector process 302 can output the determined or estimated respective components corresponding to velocity vectors, such as at a number of predefined points in the field-of-view of each of the radar transceiver units, to a detector process 304. The processor can execute instructions to perform the detector process 304.

In some examples, the detector process 304 can determine whether the velocity vector components estimated for any of the points (X, Y), such as in a grid, are reliable. For example, the detector 304 can determine that the velocity vector estimated for a point (X, Y) is unreliable if that point has an associated power P below a threshold or by using some other criterion. If below a threshold, for example, the detector can remove the data associated with those points.

In some examples, in addition to the power P, the detector process 304 can determine whether any points (X, Y), such as in a grid, have an associated velocity value, such as velocity magnitude, that is greater than a threshold, or by using some other criterion. If so, the detector can remove the data associated with those points. In this manner, the detector can filter out velocity vector estimates for which power, and/or velocity magnitude, falls below or above a specified criterion.

The detector process 304 can output a filtered detection list with the determined or estimated respective components corresponding to velocity vectors at a number of points in the field-of-view of each of the radar transceiver units to an ego-motion estimator process 306. The output can include a list of data, such as (X, Y, U, V, P), for the points that have satisfied the power/speed criteria. The detector process 304 can pass along (X, Y) data, or at least some way of cross-referencing with the full list of (X, Y), to the ego-motion estimator process 306. In some cases, the detector process 304 can also pass along the P values to weight measurements, such as based on power. As described below with respect to FIG. 4, the ego-motion estimator process 306 can process velocity vector data to estimate the ego-motion of the vehicle.

Figure 4:
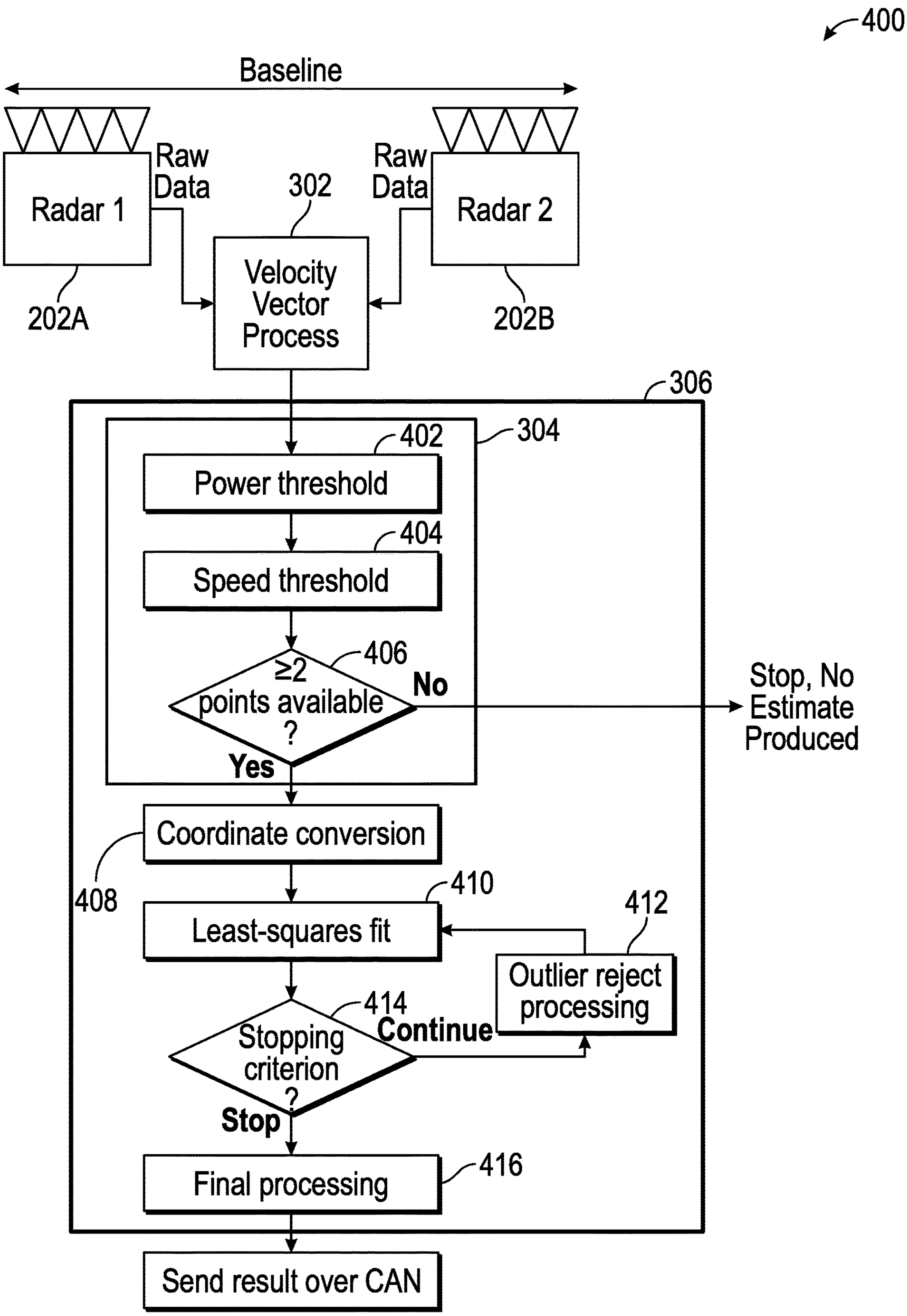
FIG. 4 is a more detailed diagram of the example of estimating an ego-motion of the vehicle shown in FIG. 3.

FIG. 4 is a more detailed diagram of the example of estimating an ego-motion of the vehicle shown in FIG. 3. The system 400 is shown with first and second radar transceiver units 202A, 202B, but can include more than two radar transceiver units when 3D motion parameters are desired, such as radar transceiver units 202A-202N of FIG. 2. The first and second radar transceiver units 202A, 202B can be in a known configuration along a baseline. In some examples, the first and second radar transceiver units 202A, 202B can be positioned toward the front of the vehicle and/or with a forward-looking field-of-view.

The first radar transceiver unit 202A can be positioned on or within the vehicle, such as the vehicle 100 of FIG. 1A or the UAV 150 of FIG. 1B, and can transmit a first signal and receive a first echo signal in response to transmitted first signal. Similarly, the second radar transceiver unit 202B can be positioned on or within the vehicle, can transmit a second signal, and can receive a second echo signal in response to transmitted second signal. The first signal and the second signal are reflected by an environment of the vehicle, such as other vehicles, buildings, signs, guardrails, grass, pavement, etc. The data representing both the first and second echo signals, e.g., raw data, from the first and second radar transceiver units 202A, 202B can be received by a processor coupled to both the first and second radar transceiver units, e.g., a common processing node, such as the processor 214 of FIG. 2. Using the data, the processor can execute instructions to perform the velocity vector process 302 to determine or estimate respective components corresponding to velocity vectors, such as vector components (U, V), at each predefined point with coordinates (X, Y) in the field-of-view of the first and second radar transceiver units 202A, 202B. The velocity vector process 302 can be performed several ways.

In a first way, the velocity vector process 302 can first compute a Fast

Fourier Transform (FFT) of the first radar transceiver unit 202A raw data along the range and angle dimensions. Then it can determine a range/angle bin in the FFT result that corresponds to the coordinate (X, Y). The slow-time phase history from this bin can be referred to as Z1. Similarly, the process 302 can compute an FFT of the raw data from the second radar transceiver unit 202B along the range and angle dimensions. The velocity vector process 302 can determine the range/angle bin in second radar FFT result that corresponds to the coordinate (X, Y). The slow-time phase history from this bin can be referred to as Z2.

The processor can average (in a geometric sense) the slow-time phase histories for the corresponding range/angle bin from each radar, or Z_rad=sqrt(Z1*Z2). The processor can use a frequency estimation algorithm to determine a radial Doppler frequency f_rad from Z_rad.

Interfering (multiplying, with complex-conjugation) the phase-history data across slow-time data for the corresponding range/angle bin from each radar, the processor can generate Ztan=Z1*conj(Z2). The processor can use a frequency estimation algorithm to determine a tangential Doppler frequency f_tan from Z_tan.

The processor can convert the estimated radial and tangential Doppler frequencies into velocities, using the formulae: v_tan=f_tan*lambda/(2c), and v_rad=f_rad*lambda/(2c), where lambda is the wavelength of the radar signal, and c is the speed of light. The processor can use a coordinate transformation to convert radial velocity and tangential velocities (v_rad, v_tan), into a velocity vector (U, V) with components in the ego-frame aligned with the vehicle. A different transformation can be used for each point in a coordinate system defined by a field-of-view, such as a grid. In this manner, the processor, such as the processor 214 of FIG. 2, can use the data representing both first and second echo signals, determine respective components corresponding to velocity vectors at respective locations in a coordinate system defined by a field-of-view. Additional information regarding the velocity vector process 302 can be found in U.S. Patent Application Publication No. 2019/0107614 to Dobrev et al., the entire contents of which being incorporated herein by reference.

In a second way that is an alternative to the first way, the velocity vector process 302 can first compute a Fast Fourier Transform (FFT) of the first radar transceiver unit 202A raw data along range and angle dimensions. It determines a range/angle bin in the FFT result that corresponds to the coordinate (X, Y). The slow-time phase history from this bin can be referred to as Z1. Similarly, the process 302 can compute an FFT of the raw data from the second radar transceiver unit 202B along the range and angle dimensions. The velocity vector process 302 can determine the range/angle bin in second radar FFT result that corresponds to the coordinate (X, Y). The slow-time phase history from this bin can be referred to as Z2.

The processor can use a frequency estimation algorithm to determine a radial Doppler frequency f_1 from Z1 and use the frequency estimation algorithm to also determine a radial Doppler frequency f_2 from Z2. The processor can convert the pair of estimated radial Dopplers (f_1, f_2) into velocities, using the formulae: v_1=f_1*lambda/(2c) and v_2=f_2*lambda/(2c) where lambda is the center wavelength of the radar emission, and c is the speed of light.

Next, the processor can solve a least-squares minimization to convert the pair of radial velocities into a velocity vector (U, V), where U is the component of the velocity in the X-direction, and V is the component of the velocity in the Y-direction in the ego-frame aligned with the vehicle, using Equation (1) below, for example:

$$U, V = \operatorname{argmin}\left(\left\| M\begin{bmatrix} U \\ V \end{bmatrix} - \begin{bmatrix} v_1 \\ v_2 \end{bmatrix}\right\|^2 + \kappa\left(v_1^2 + v_2^2\right)\right)$$

where M is a matrix whose rows are unit vectors from each radar position ($X_{R1}$, $Y_{R1}$) or ($X_{R2}$, $Y_{R2}$) to the grid point (X, Y). The matrix M is shown below:

$$M = \begin{bmatrix} \frac{\Delta X_1}{\sqrt{\Delta X_1^2 + \Delta Y_1^2}} & \frac{\Delta Y_1}{\sqrt{\Delta X_1^2 + \Delta Y_1^2}} \\ \frac{\Delta X_2}{\sqrt{\Delta X_2^2 + \Delta Y_2^2}} & \frac{\Delta Y_2}{\sqrt{\Delta X_2^2 + \Delta Y_2^2}} \end{bmatrix},$$

where $\Delta Xj=X-X_{RJ}$, and $\Delta Yj=X-Y_{RJ}$. Optionally, the least-squares minimization can include a regularization term such as $$\kappa\left(v_1^2 + v_2^2\right)$$

to penalize solutions with large magnitude values for the velocity components.

A different transformation can be used for each point in a coordinate system defined by a field-of-view, such as a grid. In this manner, the processor, such as the processor 214 of FIG. 2, can use the data representing both first and second echo signals, determine respective components corresponding to velocity vectors at respective locations in a coordinate system defined by a field-of-view.

In some examples, for each predefined point (X, Y), the velocity vector process 302 can output a data structure to the ego-motion estimator 306 with the following data: (X, Y, U, V, P), where (X, Y) are spatial coordinates of the point in the reference frame of the vehicle, (U, V) are the respective components corresponding to velocity vectors at the (X, Y) point, and P is a measure of the reflected signal power for the point. P can be the lesser of the power measured by the first radar transceiver for the (X, Y) point and the power measured second radar transceiver for the (X, Y) point, or some other measure.

In some examples, the processor can compare respective magnitudes of the respective components against a threshold. For example, at block 402, the detector 304 of the ego-motion estimator 306 can determine whether any points (X, Y) exist having an associated power P below a threshold, such as reported power P<threshold_1, or by using some other criterion. If below a threshold, for example, the detector 304 can remove the data associated with those points.

Optionally, in addition to the power P, at block 404 the detector 304 can determine whether any points (X, Y) exist having an associated velocity value, such as velocity magnitude, that is greater than a threshold, or by using some other criterion. For example, the detector can determine whether the velocity magnitude, such as given by sqrt(U^2+V^2), is greater than a threshold_2. If so, the detector 304 can remove the data associated with those points.

At block 406, the detector 304 can continue if at least two points satisfy the power threshold and, in some examples, the velocity threshold ("YES" branch of block 406). If there are not at least two points that satisfy the power threshold, the ego-motion estimator 306 can stop computing for that time period. In this case, the system can rely on an extrapolation of past estimates of the velocity parameters.

At block 408, the ego-motion estimator 306 can, if necessary, convert the coordinates for the K points that pass the threshold(s) from the coordinate system relative to the radar transceiver units to the coordinate frame of the car. Next, the ego-motion estimator 306 can use the data from the K points that pass the threshold(s) to construct a system of equations (2K equations in 3 unknowns) to obtain the 2D motion parameters of the vehicle {ω, $v_f$, $v_s$}, which are the angular velocity, the forward velocity, and the side velocity (or side-slip) of the vehicle. For 2D motion parameters, the vertical velocity of the car is assumed to be zero, and so is not included in the method. The system of equations to obtain the 2D motion parameters of the vehicle {ω, $v_f$, $v_s$} is as follows:

$$\begin{bmatrix} U_1 \\ V_1 \\ \vdots \\ U_k \\ V_k \end{bmatrix} = \begin{bmatrix} -Y_1 & 1 & 0 \\ X_1 & 0 & 1 \\ \vdots & \vdots & \vdots \\ -Y_k & 1 & 0 \\ X_k & 0 & 1 \end{bmatrix} \begin{bmatrix} \omega \\ v_f \\ v_s \end{bmatrix}$$

where U is the component of the velocity in the X-direction, V is the component of the velocity in the Y-direction. To generate 3D motion parameters, the velocity vector can include W, the component of the velocity in the Z-direction. The 3D motion parameters can further include one or more of the pitch rate, roll rate, yaw rate, and vertical velocity of the vehicle.

At block 410, a regression analysis, such as least squares fit, can be performed in conjunction with a technique to eliminate outliers. This can be helpful because some of the K velocity points can be from scatterers in the radar scene that are moving with respect to the world frame. At block 412, outliers can be mitigated using a number of techniques, such as random sample consensus (RANSAC) or iterative reweighted least squares (IRWLS).

IRWLS (IRWLS) is a technique where after each iteration, each of the K points is weighted by a number that depends on the error of that point with respect to the previous fit, such that points that had large errors receive small weights, and points that had small errors receive larger weights. At decision block 414, the processor can utilize a stopping criterion. For example, IRWLS can be repeated a fixed number of iterations, or until the difference between successive iterations is below a predetermined threshold.

RANSAC is a technique where on each iteration a random subset J of the K points are used to perform the least-square fit, then the full set of K points are evaluated against the fit, and the number of inliers counted. At decision block 414, the processor can utilize a stopping criterion. For example, RANSAC can be repeated a fixed number of times, and the solution that produced the largest number of inliers is selected.

It should be noted that for IRWLS or RANSAC, the same outlier processing can be applied to both the U and V (and optionally W) components, so U, V (and W) from a particular predefined point, e.g., grid point, are weighted the same if the method is using IRWLS, or included or excluded as a set if using RANSAC.

Using these techniques, the ego-motion estimator 306 can suppress a contribution to the estimate of the vehicle's ego-motion corresponding to targets moving with respect to a fixed frame. For example, the system of equations to obtain the 2D motion parameters of the vehicle $\{\omega, v_f, v_s\}$ illustrating a suppression corresponding to targets moving with respect to a fixed frame is shown below:

$$\begin{bmatrix} U_1 \\ V_1 \\ \vdots \\ \cancel{U_N} \\ \cancel{V_N} \end{bmatrix} = \begin{bmatrix} -Y_1 & 1 & 0 \\ X_1 & 0 & 1 \\ \vdots & \vdots & \vdots \\ \cancel{-Y_N} & \cancel{1} & \cancel{0} \\ \cancel{-X_N} & \cancel{0} & \cancel{1} \end{bmatrix} \begin{bmatrix} \omega \\ \upsilon_f \\ \upsilon_s \end{bmatrix}$$

As shown above, the pair of $(U_N, V_N)$ components associated with point $(X_N, Y_N)$ can be suppressed, such as by eliminating or by down-weighting the data, such as before or during the estimating of the motion parameters of the moving vehicle. If present, a $W_N$ component can also be suppressed.

In another example of suppression of moving targets, the processor can impose temporal coherence on the outlier rejection solution. If the processor is using IRWLS, this can be done by using an initial, e.g., prior, estimate of the ego-motion parameters to apply an initial weighting to measurements in the first iteration of IRWLS, such as to eliminate or down-weight data representing information about a moving target. Using IRWLS plus temporal coherence allows the system to obtain accurate estimates of the ego-motion parameters even for timeframes when not even a plurality of the detections made by the radar transceiver units correspond to stationary objects.

For example, the processor can predict an initial estimate for the ego-motion parameters by combining prior radar data and other sensor data, such as from the IMU 222 of FIG. 2, using a filtering method, such as an extended Kalman filter. The initial estimate can be used to compute weights for each velocity measurement in the first iteration of IRWLS. After the first iteration, IRWLS can proceed as normal. In this manner, the processor can eliminate or down-weight data representing information about a moving target before estimating the ego-motion by using a prior estimate of the ego-motion obtained by extrapolating from past estimates of the ego-motion using a filtering method.

The final processing at block 416 can output the estimated ego-motion of the vehicle, such as the 2D motion parameters or, in some examples, the 3D motion parameters. In some examples, final processing at block 416 can transmit the estimated ego-motion of the vehicle to another vehicular system, such as over a Controller Area Network (CAN bus), which can be coupled with other components of the vehicle.

Figure 5:
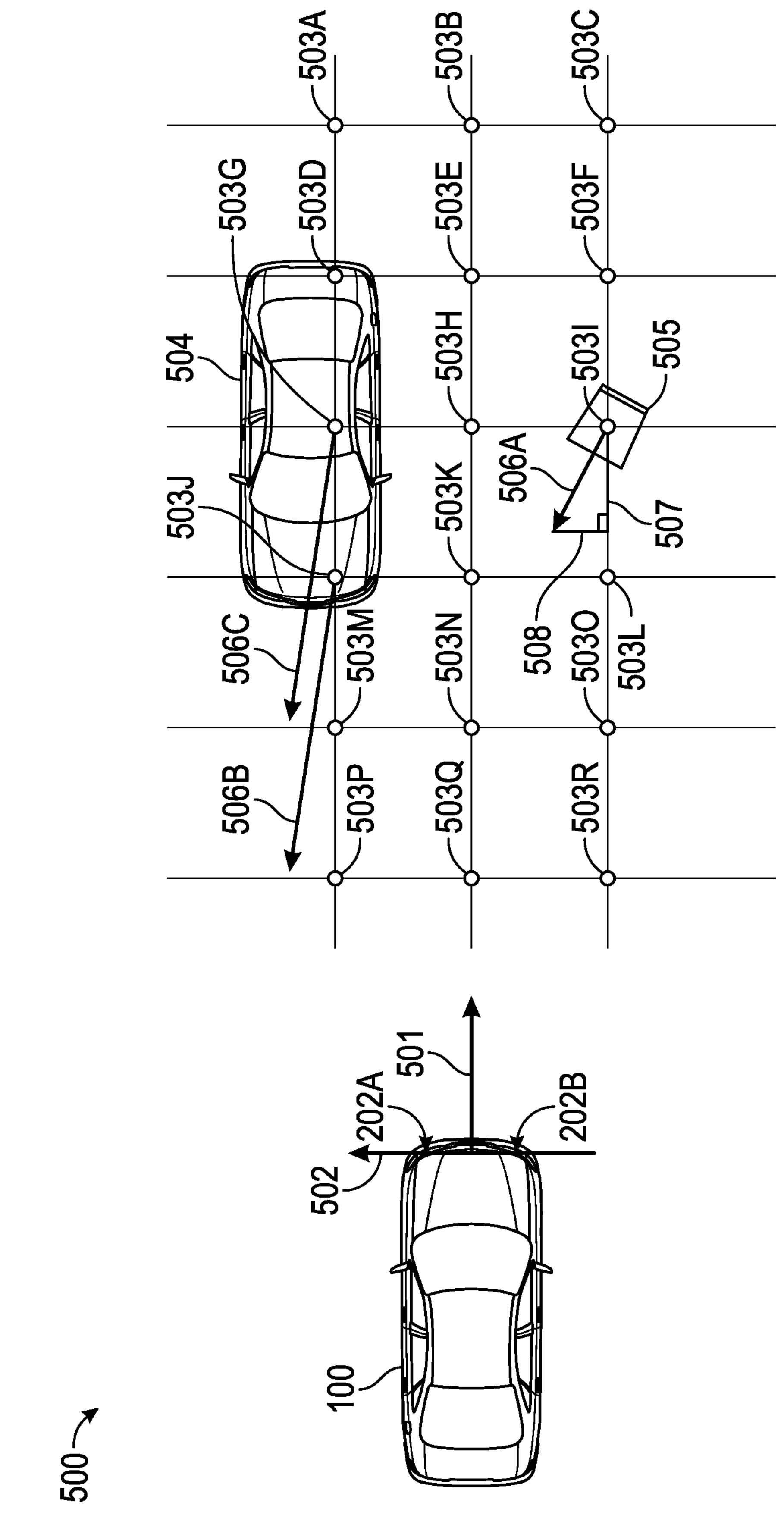
FIG. 5 is a more detailed diagram of the vehicle of FIG. 1A showing a radar scattering environment around the vehicle.

FIG. 5 is a more detailed diagram of the vehicle 100 of FIG. 1A showing a radar scattering environment 500 around the vehicle. Radar transceiver units 202A, 202B can be affixed to the vehicle 100 such that the field of view of the radar transceiver units 202A, 202B covers the front of the vehicle 100. The techniques of FIG. 5 are also applicable to the UAV 150 of FIG. 1B as well as autonomous vehicles, boats, and other objects.

Axis 501 is the x-axis of a coordinate system defined relative to the field-of-view. Axis 502 is the Y-axis of the coordinate system defined relative to the field-of-view. Points 503A-503R are examples of points, such as a set of points, defined relative to the field-of-view.

As described above, the system 200 can extract relative velocity vectors for a number of points, such as points 503A-503R, in the field-of-view of the two or more radar transceiver units 202A-202N. The points can be defined relative to a fixed frame of reference, such as the vehicle's coordinate frame. The points can be specified in a coordinate system relative to a joint field-of-view of multiple ones of the radar transceiver units 202A-202N, rather than in a range-angle space of one of the radar transceiver units 202A-202N. In this manner, the points can be common to all of the radar transceiver units 202A-202N in the system.

In some examples, the points can be arranged in a grid. In other examples, the points can be denser in the direction of travel. In some examples, the points can be denser closer to the vehicle.

Vehicle 504 is another vehicle present in the radar environment and target 505 is another target in the radar environment, such as an obstacle in the path of the vehicle 100.

Vectors 506A, 506B, 506C are the velocity vectors computed by the velocity calculation process 302 for the points 503I, 503J, 503G, respectively. The velocity vectors for all other points in this example fall below the power threshold and so have been filtered out. Reference number 507 is the component of velocity vector 506A along the X-axis 501, denoted by U. Reference number 508 is the component of velocity vector 506A along the Y-axis 502, denoted by V.

In some examples, the processor 214 of the system 200 can define the spacing of the points 503A-503R based on the resolution of the radar transceiver units. For example, in some implementations, the points 503A-503R are not placed closer together than what the radar transceiver units can resolve in either angle or range. As such, the resolution of the radar can set a lower bound for how closely the points can be grouped together.

Denser spacing of points 503A-503R closer to the vehicle and coarser spacing of points 503A-503R further away from the vehicle can be achieved due to the fixed angular resolution of the radar transceiver units. In other words, points closer to the vehicle are spaced closer together than points further from the vehicle. For example, one point per resolution cell can provide denser spacing closer to the vehicle and coarser spacing of points further away from the vehicle.

In some examples, the radar transceiver unit's field-of-view can include a cone that gets wider and wider further away from the vehicle. In such examples, the processor can restrict the area of the cone after a certain distance from the vehicle 100. For example, for a vehicle 100 traveling forward, the processor can restrict the field-of-view to 45 degrees close to the vehicle (with respect the axes 501, 502), but for distances far away from the vehicle, the field-of-view can be truncated, such as to a rectangular shape. The processor can include more points 503A-503R closer to the vehicle and fewer points 503A-503R further away from the vehicle.

In some examples, the spacing between points 503A-503R can be limited by the size of the objects to be detected.

In some examples, the processor can determine points 503A-503R based on the motion of the vehicle, such as the speed of the vehicle and/or whether the vehicle is turning.

Various Notes

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A system for estimating an ego-motion of a vehicle, the system comprising:

a first radar transceiver unit to be positioned on or within the vehicle, the first radar transceiver unit transmit a first signal and receive a first echo signal in response to the transmitted first signal;

a second radar transceiver unit to be positioned on or within the vehicle, the second radar transceiver unit to transmit a second signal and receive a second echo signal in response to the transmitted second signal, wherein the first signal and the second signal are reflected by an environment of the vehicle; and a processor coupled to both the first and second radar transceiver units, the processor to:

receive data representing both the first and second echo signals;

using the data representing both the first and second echo signals, determine respective components corresponding to velocity vectors or vector components at respective locations in a coordinate system defined relative to a field-of-view, wherein the determination includes determining respective components (U, V) corresponding to a velocity vector at (X, Y) for each respective location with coordinates (X, Y), wherein (X, Y) are spatial coordinates of a point in the coordinate system defined relative to the field-of-view, U is the component of the velocity vector in an X-direction, and V is the component of the velocity vector in a Y-direction;

cause the first radar transceiver unit and the second radar transceiver unit to perform simultaneous scans of overlapping fields-of-view, and, within a single measurement frame, determine the respective components (U, V) at each respective location using changes in phase information of the first and second echo signals corresponding to that location; and using the determined velocity vectors or vector components, estimate at least one of a velocity value, a velocity vector, or an angular rate of the vehicle, including suppressing a contribution to the estimate corresponding to at least one target moving with respect to a fixed frame of reference.

2. The system of claim 1, wherein the velocity vectors are determined at a number of points in the field-of-view of both the first and second radar transceiver units.

3. The system of claim 1, wherein suppressing the contribution to the estimate corresponding to the at least one target moving with respect to the fixed frame of reference includes:

eliminating or down-weighting data representing information about the at least one moving target before or during the estimation of the at least one of the velocity value, the velocity vector, or the angular rate of the vehicle.

4. The system of claim 1, wherein suppressing the contribution to the estimate corresponding to at least one target moving with respect to the fixed frame of reference includes:

eliminating or down-weighting data representing information about the at least one moving target before the estimation of the at least one of the velocity value, the velocity vector, or the angular rate of the vehicle using a prior estimation obtained by extrapolating from past estimates of the ego-motion.

5. The system of claim 1, the processor to:

suppress a velocity vector component that falls below or above a specified criterion.

6. The system of claim 1, the processor to determine two-dimensional motion parameters of the vehicle.

7. The system of claim 1, the processor to transmit the at least one of the velocity value, the velocity vector, or the angular rate of the vehicle to another system of the vehicle.

8. The system of claim 1, wherein the first radar transceiver unit and the second radar transceiver unit are frequency-modulated continuous wave (FMCW) radar transceiver units.

9. The system of claim 1, further comprising:

a third radar transceiver unit to be positioned on or within the vehicle, the third radar transceiver unit to transmit a third signal and receive a third echo signal in response to transmitted third signal, wherein the third signal is reflected by the environment of the vehicle, wherein the processor is further coupled to the third radar transceiver unit, the processor further to:

receive data representing the third echo signal;

using the data representing third echo signal, determine the respective components corresponding to the velocity vectors at the respective locations in the coordinate system defined by the field-of-view; and using the determined velocity vectors, estimate the at least one of the velocity value, the velocity vector, or the angular rate of the vehicle, including suppressing the contribution to the estimate corresponding to at least one target moving with respect to the fixed frame.

10. The system of claim 9, the processor to determine three-dimensional motion parameters of the vehicle.

11. A method for estimating an ego-motion of a vehicle, the method comprising:

transmitting, using a first radar transceiver unit, a first signal and receiving a first echo signal in response to the transmitted first signal;

transmitting, using a second radar transceiver unit, a second signal and receiving a second echo signal in response to the transmitted second signal, wherein the first signal and the second signal are reflected by an environment of the vehicle; and using a processor coupled to both the first and second radar transceiver units:

receiving data representing both the first and second echo signals;

using the data representing both the first and second echo signals, determining respective components corresponding to velocity vectors at respective locations in a coordinate system defined by a field-of-view, wherein the determination includes determining respective components (U, V) corresponding to a velocity vector at (X, Y) for each respective location with coordinates (X, Y), wherein (X, Y) are spatial coordinates of a point in the coordinate system defined relative to the field-of-view, U is the component of the velocity vector in an X-direction, and V is the component of the velocity vector in a Y-direction;

performing, using the first radar transceiver unit and the second radar transceiver unit, simultaneous scans of overlapping fields-of-view, and, within a single measurement frame, determining the respective components (U, V) at each respective location using changes in phase information of the first and second echo signals corresponding to that location; and using the determined velocity vectors, estimating at least one of a velocity value, a velocity vector, or an angular rate of the vehicle, including suppressing a contribution to the estimate corresponding to at least one target moving with respect to a fixed frame of reference.

12. The method of claim 11, wherein suppressing the contribution to the estimate corresponding to the at least one target moving with respect to the fixed frame includes:

eliminating or down-weighting data representing information about the at least one moving target before or during the estimation of the at least one of the velocity value, the velocity vector, or the angular rate of the vehicle.

13. The method of claim 11, wherein suppressing the contribution to the estimate corresponding to the at least one target moving with respect to the fixed frame includes:

eliminating or down-weighting data representing information about the at least one moving target before the estimation of the at least one of the velocity value, the velocity vector, or the angular rate of the vehicle using a prior estimation obtained by extrapolating from past estimates of the ego-motion.

14. The method of claim 11, comprising:

suppressing a velocity vector component that falls below or above a specified criterion.

15. The method of claim 11, comprising:

determining two-dimensional motion parameters of the vehicle.

16. The method of claim 11, comprising:

transmitting the at least one of the velocity value, the velocity vector, or the angular rate of the vehicle to another system of the vehicle.

17. A system for estimating a self-motion of a vehicle, the system comprising:

a first frequency-modulated continuous wave (FMCW) radar transceiver unit to be positioned on or within the vehicle, the first radar transceiver unit to transmit a first signal and receive a first echo signal in response to the transmitted first signal;

a second FMCW radar transceiver unit to be positioned on or within the vehicle, the second radar transceiver unit to transmit a second signal and receive a second echo signal in response to the transmitted second signal;

a third FMCW radar transceiver unit to be positioned on or within the vehicle, the third radar transceiver unit to transmit a third signal and receive a third echo signal in response to transmitted third signal, wherein the first signal, the second signal, and the third signal are reflected by an environment of the vehicle; and a processor coupled to each of the first FMCW radar transceiver unit, the second FMCW radar transceiver unit, and the third FMCW radar transceiver unit, the processor to:

receive data representing the first echo signal, the second echo signal, and the third echo signal;

using the data representing the first echo signal, the second echo signal, and the third echo signal, determine respective components corresponding to velocity vectors at respective locations in a coordinate system defined by a field-of-view, wherein the determination includes determining respective components (U, V) corresponding to a velocity vector at (X, Y) for each respective location with coordinates (X, Y), wherein (X, Y) are spatial coordinates of a point in the coordinate system defined relative to the field-of-view, U is the component of the velocity vector in an X-direction, and V is the component of the velocity vector in a Y-direction;

cause the first radar transceiver unit and the second radar transceiver unit to perform simultaneous scans of overlapping fields-of-view, and, within a single measurement frame, determine the respective components (U, V) at each respective location using changes in phase information of the first and second echo signals corresponding to that location; and using the determined velocity vectors, estimate at least one of a velocity value, a velocity vector, or an angular rate of the vehicle, including suppressing a contribution to the estimate corresponding to at least one target moving with respect to a fixed frame of reference.

18. The system of claim 17, the processor to determine three-dimensional (3D) motion parameters of the vehicle.

19. The system of claim 17, wherein the 3D motion parameters include yaw rate, pitch rate, and roll rate.

20. The system of claim 17, wherein suppressing the contribution to the estimate corresponding to the at least one target moving with respect to the fixed frame includes:

eliminating or down-weighting data representing information about the at least one moving target before or during the estimation of the at least one of the velocity value, the velocity vector, or the angular rate of the vehicle.

21. A system for estimating an ego-motion of a vehicle, the system comprising:

a first radar transceiver unit to be positioned on or within the vehicle, the first radar transceiver unit transmit a first signal and receive a first echo signal in response to the transmitted first signal;

a second radar transceiver unit to be positioned on or within the vehicle, the second radar transceiver unit to transmit a second signal and receive a second echo signal in response to the transmitted second signal, wherein the first signal and the second signal are reflected by an environment of the vehicle; and a processor coupled to both the first and second radar transceiver units, the processor to:

receive data representing both the first and second echo signals;

using the data representing both the first and second echo signals, determine respective components corresponding to velocity vectors or vector components at a number of points in a coordinate system defined relative to a field-of-view of both the first and second radar transceiver units, wherein the determination includes determining respective components (U, V) corresponding to a velocity vector at (X, Y) for each respective location with coordinates (X, Y), wherein (X, Y) are spatial coordinates of a point in the coordinate system defined relative to the field-of-view, U is the component of the velocity vector in an X-direction, and Vis the component of the velocity vector in a Y-direction; and cause the first radar transceiver unit and the second radar transceiver unit to perform simultaneous scans of overlapping fields-of-view, and, within a single measurement frame, determine the respective components (U, V) at each respective location using changes in phase information of the first and second echo signals corresponding to that location.

22. The system of claim 21, the processor to estimate at least one of a velocity value, a velocity vector, or an angular rate of the vehicle, including suppressing a contribution to the estimate corresponding to at least one target moving with respect to a fixed frame of reference.

23. The system of claim 21, wherein points closer to the vehicle are spaced closer together than points further from the vehicle.

24. The system of claim 21, the processor to determine the points based on a motion of the vehicle.

* * * * *